United States Patent [19]

Goto et al.

[11] 4,160,268
[45] Jul. 3, 1979

[54] SIGNAL PICKUP DEVICE WITH TRACKING CONTROL AND JITTER COMPENSATION FOR A VIDEO DISC

[75] Inventors: Kunio Goto, Yokohama; Osamu Tajima, Ayase; Hideaki Miyatake, Yamato, all of Japan

[73] Assignee: Victor Company of Japan, Ltd., Yokohama, Japan

[21] Appl. No.: 891,492

[22] Filed: Mar. 29, 1978

[30] Foreign Application Priority Data

Mar. 31, 1977 [JP] Japan .................... 52-35502
Apr. 11, 1977 [JP] Japan .................... 52-41151
Sep. 29, 1977 [JP] Japan ................ 52-130924[U]
Oct. 7, 1977 [JP] Japan .................... 52-119999
Oct. 12, 1977 [JP] Japan .................... 52-122230

[51] Int. Cl.$^2$ .................... G11B 3/38; G11B 21/10
[52] U.S. Cl. .................... 358/128; 179/100.3 V; 179/100.41 D; 360/75; 360/77
[58] Field of Search ............ 358/128; 179/100.3 V, 179/100.4 R, 100.4 D, 100.41 D, 100.41 G; 360/10, 75, 77, 78

[56] References Cited

U.S. PATENT DOCUMENTS

| | | | |
|---|---|---|---|
| 2,027,168 | 1/1936 | Harrison | 179/100.41 D |
| 2,105,916 | 1/1938 | Harrison | 179/100.41 D |
| 3,917,903 | 11/1975 | Taylor et al. | 179/100.41 G |
| 3,961,131 | 6/1976 | Taylor | 360/10 X |
| 3,983,318 | 9/1976 | Miller et al. | 179/100.3 V |

*Primary Examiner*—James W. Moffitt
*Assistant Examiner*—Donald McElheny, Jr.
*Attorney, Agent, or Firm*—Haseltine, Lake & Waters

[57] ABSTRACT

A signal pickup device comprises a reproducing stylus for tracing a track on a rotary recording medium thereby to reproduce the information signal recorded thereon, a cantilever provided at a free distal end thereof with the reproducing stylus, means for supporting the cantilever so as to be rotatable about substantially proximal root end thereof and movable in an longitudinal direction thereof, coil means including at least two movable coils fixed to the support means, means for generating a control signal current in response to deviation of the tracing position of the reproducing stylus from a track to be traced, and supplying the control signal to the coils, and magnetic field forming means secured at a predetermined position of a main body of the device and adapted to apply to the coils a magnetic field in a direction parallel with the rotary recording medium. The coils undergo a motion due to a mutual interaction between the magnetic field and the current flowing therethrough, whereby the reproducing stylus is displaced by way of the cantilever at least in the width of the track and is thereby tracking controlled.

10 Claims, 36 Drawing Figures

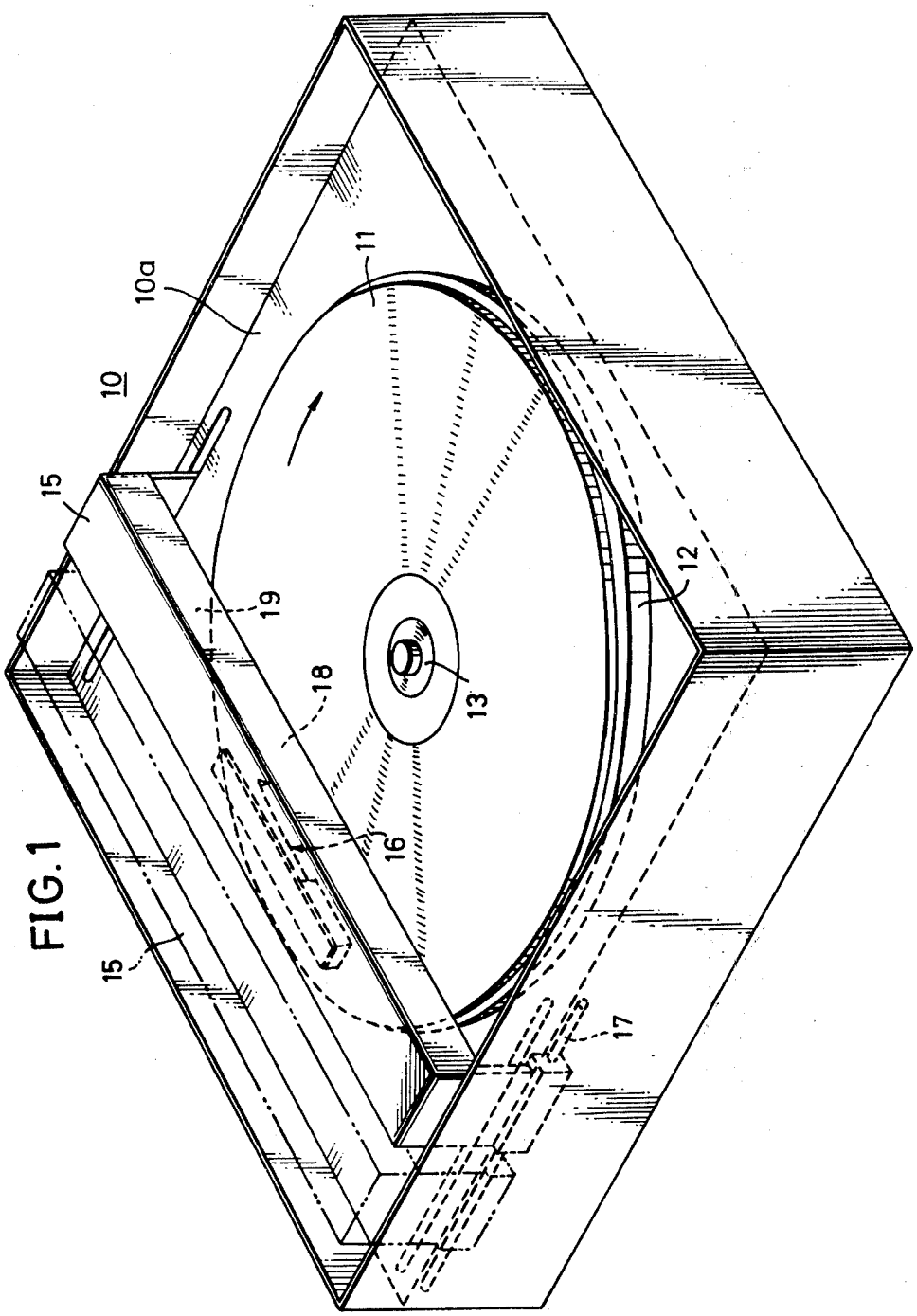

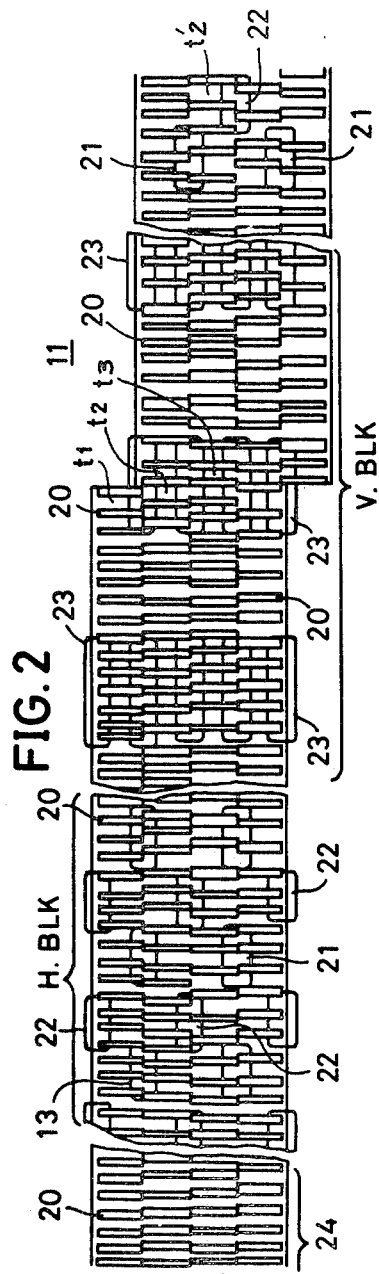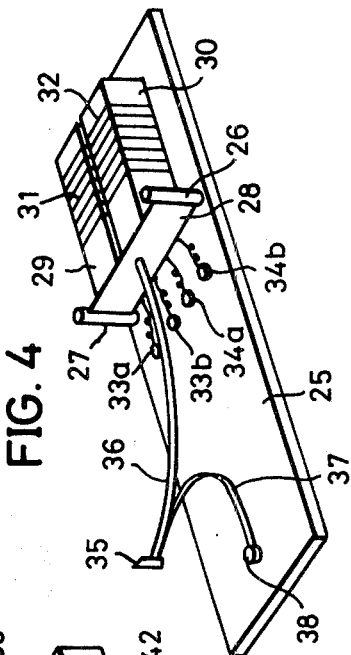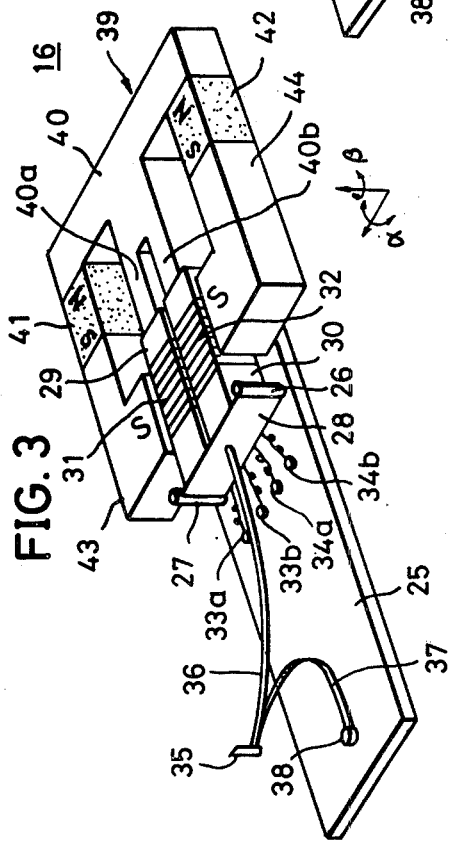

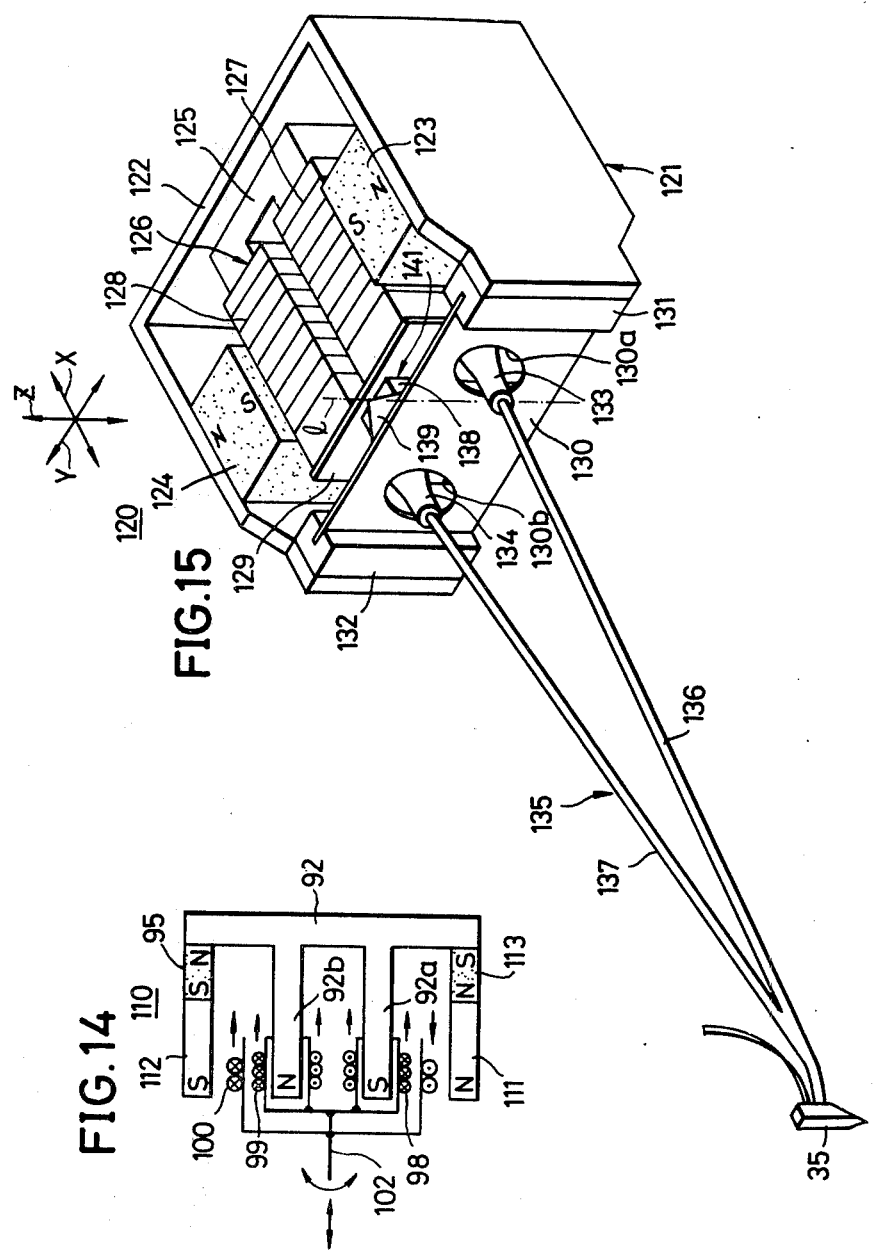

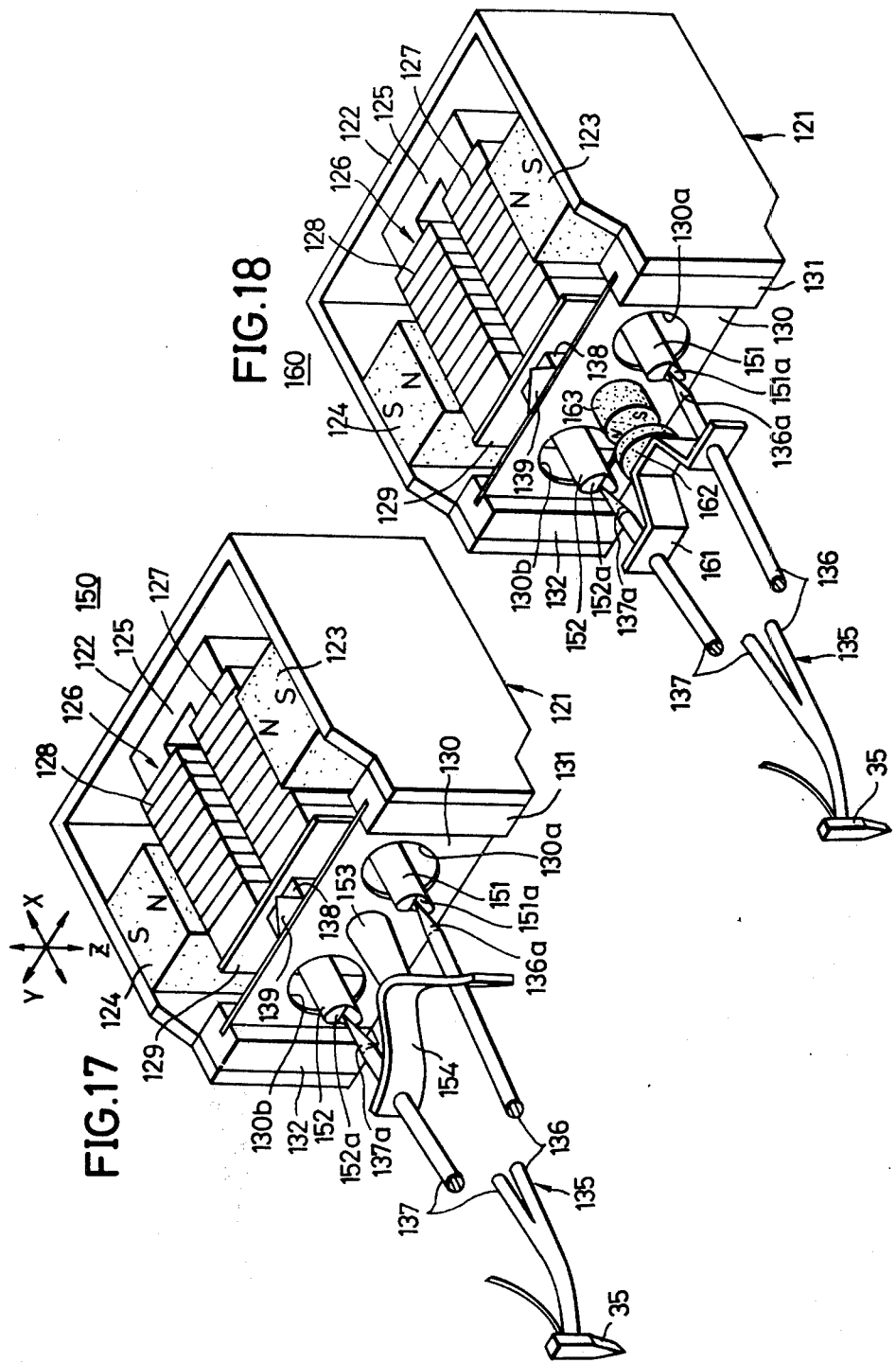

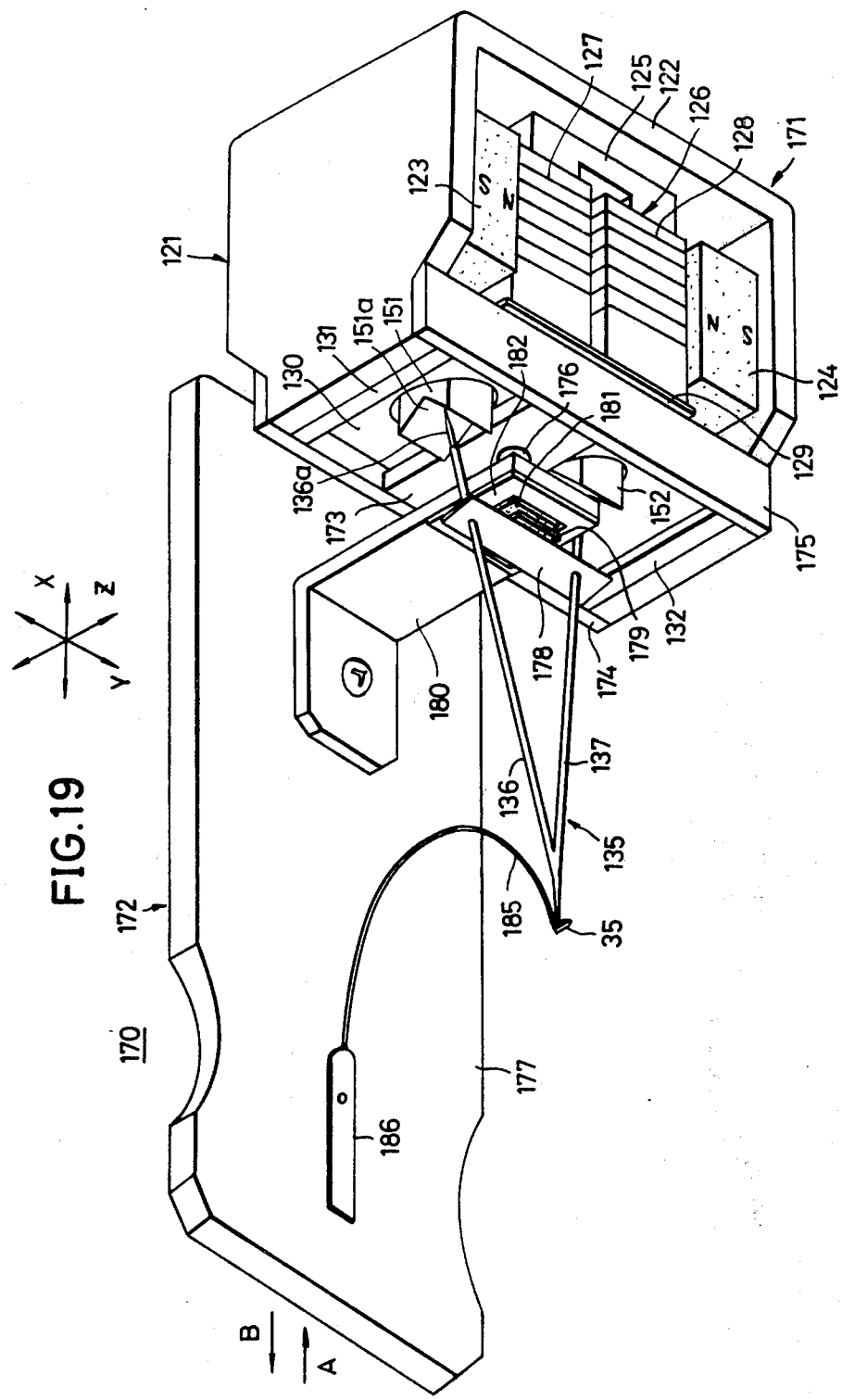

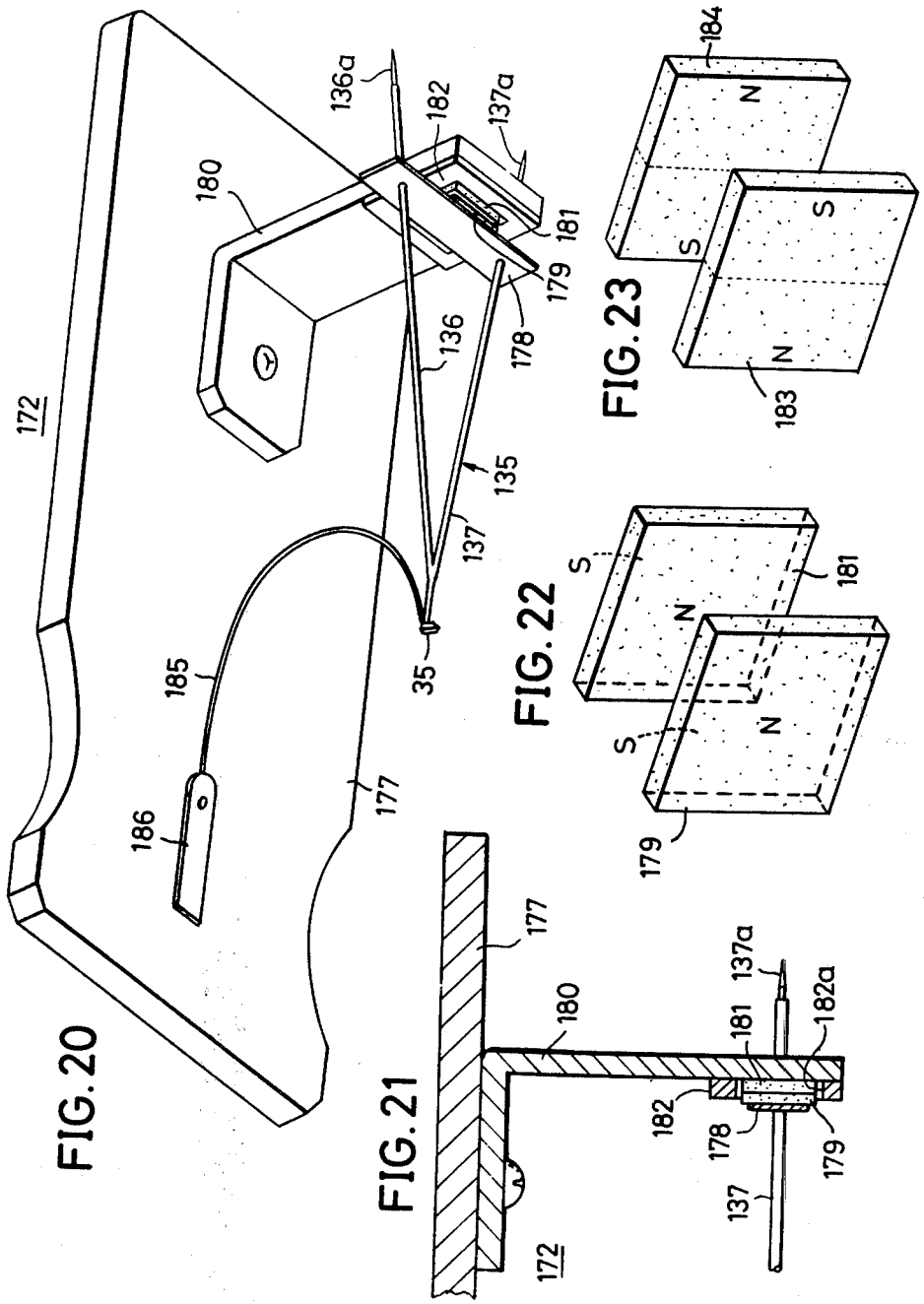

SIGNAL PICKUP DEVICE WITH TRACKING CONTROL AND JITTER COMPENSATION FOR A VIDEO DISC

BACKGROUND OF THE INVENTION

The present invention relates to signal pickup devices in apparatuses for reproducing recorded signals from rotary recording mediums. More particularly, the invention relates to a signal pickup device capable of tracking control, in an apparatus for reproducing a video signal from a rotary disc on which the video signal has been recorded on a spiral track or concentric circular tracks, in a manner such that a reproducing stylus for reproducing the video signal traces accurately on the track, and capable of jitter compensation in a manner such that a reproducing stylus moves in the longitudinal direction of track.

Heretofore, there have been apparatuses of the type wherein, for example, a rotary disc (referred to as "disc" hereinafter) on which a video signal has been recorded on a spiral track as variations in the geometrical shapes corresponding to an information content is rotated, and a reproducing transducer, that is, a signal pickup device is caused to trace relatively the spiral track thereby to reproduce the recorded video signal. In a signal pickup device of this character, it is necessary that the signal pickup device trace the track accurately. For this reason, it is necessary to provide means for detecting any tracking deviation of the signal pickup device relative to the above mentioned track on the disc and controlling, in response to this error, the position of the signal pickup device so that it will trace accurately over the track thereby to accomplish tracking control.

The present applicant has previously proposed a signal pickup device in which a permanent magnet member of the shape of a rectangular parallelepiped and having magnetic poles on the opposite lateral faces thereof is fixed to the proximal end of a cantilever. A first coil is disposed to surround the permanent magnet member. Second coils are disposed to confront with each magnetic pole of the permanent magnet member. In this device, when the tracking control signal current and the jitter compensation signal current respectively flow through the first coil and the second coils, the permanent magnet member is energized to rotate about a hypothetic vertical axis thereof and to displace in the longitudinal direction thereof, according to Fleming's left-hand rule, whereby the cantilever is rotated and displaced in the axial direction of the cantilever. Tracking control operation and jitter compensation operation are thereby carried out.

This signal pickup device, however, is accompanied by following problems, due to its construction. The permanent magnet member, which is a moving member, is required to be miniaturized and light-weighted, which causes inevitably the magnetic force thereof to be small. Accordingly, the driving force of the permanent magnet member becomes small, whereby the operation of the cantilever with large driving force becomes difficult, thereby arising difficulties that the prescribed control operation cannot be performed.

SUMMARY OF THE INVENTION

Accordingly, it is a general object of the present invention to provide a novel and useful signal pickup device of an apparatus for reproducing rotary recording mediums, in which device the above described problem has been overcome.

Another and specific object of the invention is to provide a signal pickup device in which two coils are fixed to the proximal root part of a rotatably supported cantilever having a reproducing stylus at its distal free end and are disposed within a strong magnetic field developed by a stationary large permanent magnet member. Accordingly, the two coils are subjected to a torque and/or a force in the winding axial direction when a control signal current is passed therethrough thereby to accomplish tracking control operation and/or jitter compensation control operation with high gain.

Another object of the invention is to provide a signal pickup device in which three coils are fixed to the proximal part of a cantilever and are disposed within a magnetic field developed by a stationary permanent magnet member, and in which two coils among three coils are subjected to a torque when a tracking control signal current flows therethrough and the remaining coil is subjected to displace in the winding axial direction when a jitter compensation signal current flows therethrough, whereby the tracking control and jitter compensation operation are effectively carried out. According to this device, circuit means for operating the tracking control signal current and the jitter compensation signal current is not required to provide.

Still another object of the present invention is to provide a signal pickup device in which a suspension mechanism is incorporated therein, which mechanism is so arranged that a moving structure moves with smoothness at the time of tracking control operation and jitter compensation operation, and that any displacement of the moving structure in the other directions is effectively obstructed.

A further object of the present invention is to provide a signal pickup device which incorporates therein a mechanism which presses the proximal part of a cantilever against a pivot bearing mounted to the moving coils and thereby to engage with the pivot bearing, and a mechanism in which a damper, which does not serve to transmit force at the time of jitter compensation operation, applies a stylus pressure to a reproducing stylus against the disc.

A still further object of the present invention is to provide a signal pickup device in which a cantilever is connected to an actuator by a magnetic attraction force, whereby the cartridge construction is adopted to the cantilever.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 1 is a general perspective view of one example of an apparatus for reproducing rotary recording mediums in which the signal pickup device according to the invention can be applied;

FIG. 2 is a fragmentary, enlarged plan view showing one embodiment of a track pattern according to the invention on a rotary recording medium;

FIG. 3 is a perspective view showing a first embodiment of a signal pickup device according to the present invention upside down;

FIG. 4 is a perspective view of coils and a cantilever extracted from the device shown in FIG. 3;

FIG. 14 is a schematic illustration showing an operational principle of another modification of the signal pickup device shown in FIG. 9;

FIG. 15 is a perspective view of a third embodiment of a signal pickup device of the invention;

FIG. 17 is a perspective view of a fourth embodiment of a signal pickup device of the invention;

FIG. 18 is a perspective view of a fifth embodiment of a signal pickup device of the invention;

FIG. 19 is a perspective view, as viewed from the bottom, of a sixth embodiment of a signal pickup device of the invention;

FIG. 20 is a perspective view showing a cartridge structure illustated in FIG. 19;

FIG. 21 is a longitudinal section showing an essential part of the cartridge structure;

FIG. 22 and FIG. 23 are schematic illustrations respectively showing combination of a pair of magnet plates assembled into the cartridge structure;

FIG. 29 is an exploded perspective view of the actuator;

DETAILED DESCRIPTION

Figure 5A:
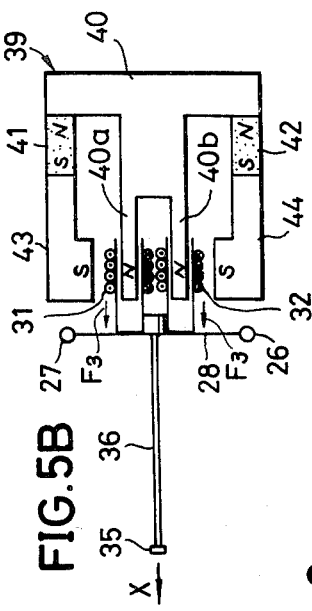
FIGS. 5A and 5B are schematic illustrations respectively indicating operation principle of the device shown in FIG. 3.

The general features of the exterior of a reproducing apparatus 10 for reproducing a rotary recording medium, in which a signal pickup device according to the invention is applied, is illustrated in FIG. 1. In this apparatus 10, a rotary disc 11, constituting the rotary recording medium and having a video signal recorded thereon, is set on a turntable 12 and clamped thereon by a clamper 13 and is thus rotated unitarily with the turntable 12 at a rotational speed of 900 rpm. On the disc 11, a video signal of two frames, that is, four fields, per revolution with spiral tracks is recorded with pits formed responsive to the information content of the signal.

One part of this track is shown in an enlarged scale in FIG. 2. Track turns, of the single continuous track of spiral shape, corresponding to respective revolutions of the disc 11 are designated as $t_1, t_2, t_3 \ldots$ . Each track turn is constituted by the formation of pits 20 of the main information signal along the track path. With respect to one track turn $t_1$, every period H, at a position (H.BLK) corresponding to the horizontal blanking period, pits 21 of the first pilot signal fp1 and formed on one lateral side of the track as viewed in the track path direction (for example, on the right hand side in the direction of rotation), and pits 22 of the second pilot signal fp2 are formed on the other side (left hand side) of the track. With respect to the adjacent track $t_2$, the pits 22 of the second pilot signal fp2 are formed on one side (right hand side) thereof as viewed in the track path direction at a position corresponding to the horizontal blanking period every period H, and on the other side (left hand side), the pits 21 of the first pilot signal fp1 are formed. Thus, the positions at which the pits 21 and the pits 22 of the first and second pilot signals fp1 and fp2 are formed are alternately reversed in the disc radial direction.

In addition, pits 23 of the third pilot signal fp3 are formed in the position (V.BLK) corresponding to the vertical blanking period coinciding with the parts where the track turn designation numbers change.

In the present embodiment of the invention, the pilot signal pits 21 and 22 are formed at only the position H.BLK within every one period H and are not formed at other parts 24, but the pit 21 and 22 may be formed also in these parts 24.

Referring again to FIG. 1, a signal pickup device 16 is mounted at a re-entrant cylindrical cavity resonator 18 provided within a carrier 15 and connected to a central conductor (not shown) of the resonator. The cental conductor is electro-magnetically connected to a high frequency oscillator 19 for producing an oscillation of frequency of 1 GHz, for example. These organization is well known. The carrier 15, which is disposed horizontally above the turntable 12, is guided at its ends by a pair of parallel horizontal guide bars 17 (only one shown) provided below a base plate 10a. This carrier 15, driven by a driving mechanism (not shown), moves continuously in horizontal translation at a speed of the distance of one track pitch per revolution of the turntable 12 in synchronism with the rotation thereof. As a result of this movement of the carrier 15, a reproducing stylus of the reproducing transducer 16 travels in translation relative to the disc 11 along the radial direction thereof and traces relatively the spiral track of the disc 11 undergoing rotation.

A first embodiment of the signal pickup device 16 according to the present invention will now be described with reference to FIGS. 3 and 4.

A rubber sheet 28 is stretched between pins 26 and 27 fixed to a support plate 25. Coil bobbins 29 and 30 of rectangular cross-sectional shape are fitted to the rubber sheet 28 and are adjacently positioned with a specific gap therebetween, and the axial directions of the coil bobbins 29 and 30 coincide with the axial direction of a cantilever 36. Coils 31 and 32 are respectively wound around the bobbins 29 and 30 in the number of about 100 through 300 turns. Lead wires of the coil 31 are electrically connected to terminals 33a, 33b on the support plate 25. Lead wires of the other coil 32 are connected to terminals 33c and 33d.

The cantilever 36 is provided at its distal free end with a reproducing stylus 35. The proximal root part of the cantilever 36 is pierced through the rubber sheet 28 and inserted into a gap between the bobbins 29 and 30, and is thus fixed, whereby the cantilever 36 undergoes a displacement unitarily with the bobbins 29 and 30. The electrode of the reproducing stylus 35 is electrically connected by way of a metal ribbon 37 to a terminal 38 on the support plate 25.

Figure 5B:
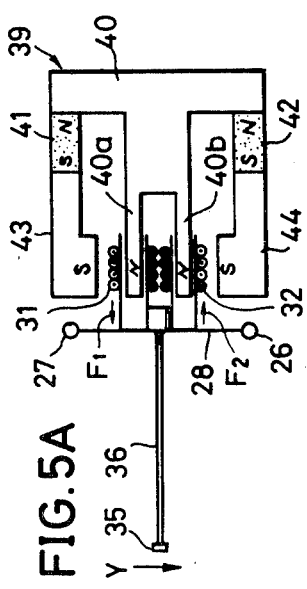

A magnetic field forming structure 39 is a combination of a substantially T-shaped yoke 40, a pair of Alnico permanent magnet members 41 and 42, and a pair of members 43 and 44 for forming external magnetic flux path, thereby forming, as a whole, the shape of a letter "E" substantially, and is secured at a predetermined position. The permanent magnet members 41 and 42 are determined or set their magnetic poles as illustrated in FIG. 3, whereby the N pole is induced at a couple of divided arms 40a and 40b of the yoke 40 as indicated in FIGS. 5A and 5B, and the S pole is induced at the distal end parts of the members 43 and 44.

Accordingly, in the structure 39, the strong magnetic field is formed only in a gap between the yoke arm 40a and the member 43 and in a gap between the yoke are 40b and the member 43. No magnetic field is formed whatsoever in a gap between the yoke arms 40a and 40b.

The arms 40a and 40b of the yoke 40 are loosely fitted into the coil bobbins 31 and 32 with gaps therearound respectively, and the pair of members 43 and 44 are positioned to confront respectively with the outer lateral winding faces of the coils 31 and 32. With this arrangement, the coils 31 and 32 are disposed in such a manner that only the outer lateral winding faces thereof are positioned within the magnetic field.

The signal pickup device of the above described construction according to the invention operates as follows.

Figure 6:
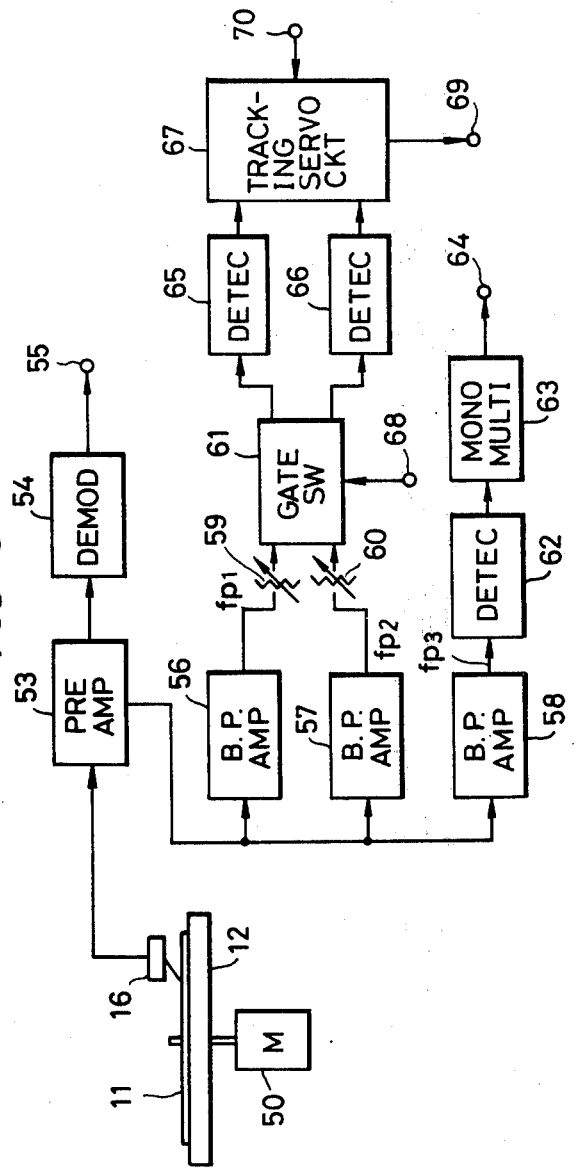
FIG. 6 is a block schematic diagram of one example of a tracking servo circuit.

In FIG. 6, the disc 11 rests on the turntable 12 and rotates together therewith at a rotational speed of 900 rpm., being driven by a motor 50. As the disc 11 rotates with oscillation of its surface, the cantilever 36 rotates in the α direction shown in FIG. 3, being accompanied by a deformation of the rubber sheet 28, and the reproducing stylus 35 traces as it follows up the disc 11. A reproduced signal, picked up as a minute variation of electrostatic capacitance by the reproducing stylus 35 from the disc 11, is supplied to a preamplifier 53 having a resonant circuit. The resonant frequency varies in response to this variation in electrostatic capacitance and is formed into a signal of a desired level. The resulting output of the preamplifier 53, is demodulated into the original information signal by a demodulator 54 and is sent out as an output through an output terminal 55.

The output signal of the preamplifier 53, is supplied respectively to amplifiers 56, 57, and 58. Here, each of the amplifiers 56 and 57 is a kind of band-pass amplifier. The amplifier 56 is designed to have a steep passing frequency characteristic at only the frequency fp1. The amplifier 57 is designed to have a steep passing frequency characteristic at only the frequency fp2. A first pilot signal of frequency fp1 and a second pilot signal of frequency fp2 obtained separately from the amplifiers 56 and 57, respectively pass through level adjustors 59 and 60, where their levels are adjusted. The resulting signals are then supplied to a gate switching circuit 61.

The amplifier 58 is a kind of band-pass amplifier which is designed to have a steep passing frequency characteristic at only the frequency fp3, and whereby causing a third pilot signal of the frequency fp3 to pass therethrough. The third pilot signal obtained from the amplifier 53 is supplied to a detecting circuit 62 and detected thereat. The resulting output signal is supplied to a monostable multivibrator 63 to operate it. The monostable multivibrator 63 is provided to make no response to noise components. The output signal thereof is derived from an output terminal 64. In normal reproducing mode, the output signal from the terminal 64 is applied to a flip-flop circuit (not shown) to trigger it. The output signal of the flip-flop circuit is applied, through an input terminal 68, to a gate switching circuit 61 as a switching pulse.

The gate switching circuit 61 switches the pilot signal fp1 and fp2 every revolution period of the disc 50 in response to the switching pulse supplied through the terminal 68. The disc rotational speed in the present embodiment of the invention is 900 rpm. as mentioned hereinbefore. Therefore, two frames of the video signal are recorded for each revolution of the disc 11. As a result, a switching pulse undergoes inversion of polarity every two frames (1/15 second). The gate switching circuit 61 supplies the signals fp1 and fp2, respectively, to detecting circuit 65 and 66.

The detecting circuit 65 and 66 detect the envelopes of their respective input reference signals and convert the envelopes into DC voltages. These voltages are then supplied to the input terminals of differential amplifiers (not shown) within a tracking servo circuit 67. This tracking servo circuit 67 compares the output signals of the two detecting circuits 65 and 66 which vary in response to the reproduced levels of the signals fp1 and fp2. This generates an output tracking error signal which indicates the tracking error direction and the error quantity. This error signal is further amplified to a specific level by known circuitry. Then, it is led out through an output terminal 69 and is then supplied to one input terminal 80 of an operation circuit indicated in FIG. 8.

At the time of special reproduction such as still reproduction or slow-motion reproduction, a kick-back pulse formed from the signal from the terminal 64 is applied through the terminal 70 to the tracking servo circuit 67.

Figure 7:
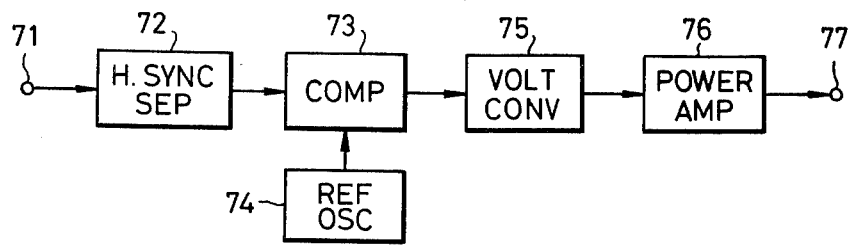
FIG. 7 is a block diagram of one example of a jitter compensation circuit.

The demodulated video signal from the aforementioned demodulator 54 is passed through a terminal 71 as shown in FIG. 7 and applied to a horizontal synchronizing signal separation circuit 72, where the horizontal synchronizing signal is separated. This output horizontal synchronizing signal is supplied to a comparison circuit 73, where it is frequency compared with a reference signal of 15.75 KHz from a reference signal oscillator 74. If jitter is being produced, a frequency signal responsive to the degree of jitter is produced as output from the comparison circuit 73. This output signal is converted into voltage by a frequency-voltage conversion circuit 75 and, further, is amplified by a power amplification circuit 76, and the resulting jitter compensation current is led out through an output terminal 77 to be supplied to the other input terminal 81 of the operation circuit.

In this circuit, the tracking error signal passes through a level adjuster 82, where its level is adjusted, and is then supplied to a (+) terminal of an adder 84 and to a (−) terminal of a subtractor 85. The jitter compensation signal passes through a level adjuster 83 to be adjusted its level, and is then supplied to a (+) terminal of the subtractor 85 and a (−) terminal of the adder 84. A sum signal from the adder 84 is amplified by a driving amplifier 86 and then supplied to the coil 31. A difference signal from the subtractor 85 is amplified by a driving amplifier 87 and then supplied to the coil 32.

Here, when the jitter does not occur and only the tracking error occurs, the tracking error signal current having the same level flows through the coils 31 and 32 in mutually opposite directions as shown in FIG. 5A. As current flows, a force $F_1$ in the direction toward the reproducing stylus is induced in the vertical winding part of the coil 31 on its outer side in the vicinity of the S-pole member 43, and a force $F_2$ in the direction opposite thereto is induced in the vertical winding part of the coil 32 on its outer side in the vicinity of the S-pole member 44, according to Fleming's left-hand rule. As a result, the above mentioned two forces act as a couple of forces on the coils 31 and 32, whereby a torque is exerted about an imaginary vertical axis passing through the center of gravity of the coils 31 and 32. As a result of this torque, the cantilever 26 rotates (in the $\beta$ direction in FIG. 3), accompanied by a deformation or bending of the rubber damper 28, and the reproducing stylus 35 is displaced in the arrow direction Y (disc radial direction). Thus, the reproducing stylus traces accurately and positively along the track, whereby tracking control of the reproducing stylus is accomplished.

When tracking error does not occur and only the jitter occurs, the jitter compensation current having the same level flows through the coils 31 and 32 in the same direction, as shown in FIG. 5B. As current flows, a force $F_3$ in the direction toward the reproducing stylus is induced in the vertical winding part of the coil 31 on its outer side confronting with the S-pole member 43, according to Fleming's left-hand rule. A force $F_3$ is also induced in the vertical winding part of the coil 32 on its outer side confronting with the S-pole member 44 in the same manner. As a result, a force in the direction toward the reproducing stylus 35 is produced on the coils 31 and 32. Consequently, the cantilever 36 is displaced in its axial direction, accompanied by displacement or bending of the rubber sheet 28, and the reproducing stylus 35 is displaced in the arrow direction X (longitudinal direction of the track), whereby jitter compensation is accomplished.

Moreover, when both of tracking error and jitter occur, signal currents which are obtained through adding and subtracting operation in the operation circuit flow through the coils 31 and 32 respectively. As a result, a torque in response to the magnitude of tracking error and displacing force in response to the magnitude of jitter are respectively induced on the coils 31 and 32, and the reproducing stylus 35 undergoes a displacement in the arrow direction Y and X, whereby tracking control and jitter compensation are accomplished.

The effective value of the level of current flowing through the coils 31 and 32 is, for example, of the order of 500 mA.

Next, a second embodiment of the signal pickup device according to the present invention will be described with reference to FIG. 9 through FIG. 13.

Referring to FIG. 9 through FIG. 12, a signal pickup device 90 has a magnetic field forming structure 91. In the structure 91, a yoke 92 having a pair of arms 92a and 92b projected therefrom and a front plate 93 of ferromagnetic material clamp a couple of permanent magnet members 94 and 95 therebetween. A center opening part 93a of the plate 93 surrounds the distal parts of the arms 92a and 92b. In this construction, the pair of arms 92a and 92b assume the N pole and the opening part 93a the S pole, whereby the magnetic field is now formed in a circular gap between the opening part 93a and the arms 92a and 92b.

A leaf spring 96 is screw fastened at its bent parts in the opposite sides to the front plate 93, and a non-magnetic mounting member 97 is fitted to the leaf spring 96 at its center position.

Figure 10:
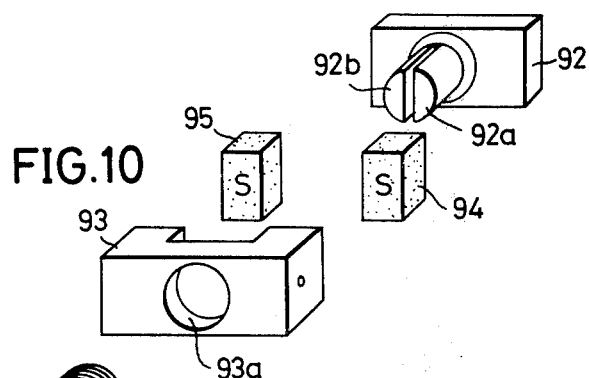
FIG. 10 is an exploded perspective view of an actuator in FIG. 9.
Figure 11:
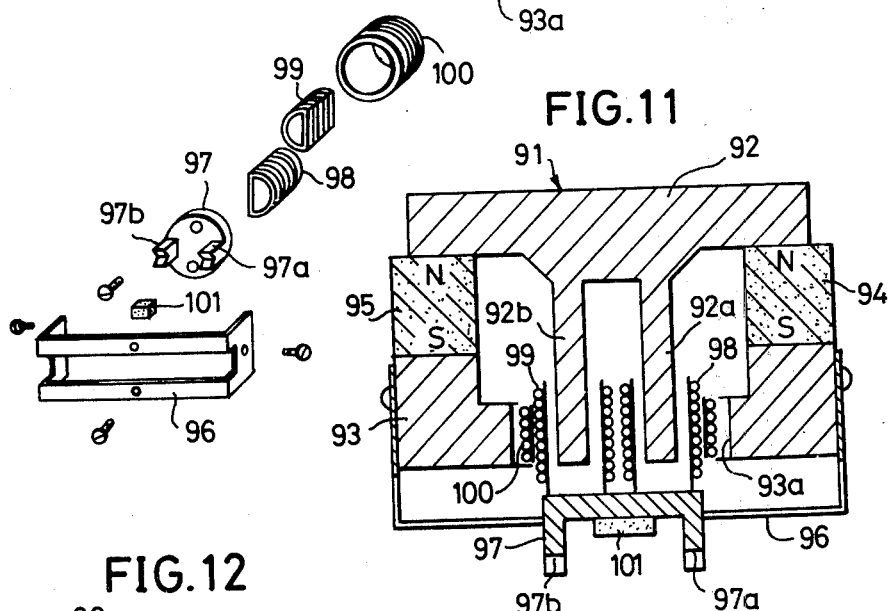
FIG. 11 is a plan view in lateral cross section of an actuator in FIG. 9.

Coils 98 and 99 for tracking control are connected in series so that currents will flow therethrough in respectively opposite directions, and are secured to the mounting member 97. The coils 98 and 99 are wound in a semi-circular cross-sectional shape as shown in FIG. 10 and are loosely engaged with the yoke arms 92a and 92b. Coil 100 for jitter compensation is wound around the coils 98 and 99 and is positioned between the yoke arms 92a and 92b and the front plate opening part 93a.

The mounting member 97 is formed at opposite sides on the front surface thereof with a pair of V-shaped projections 97a and 97b, and is provided at the front center part thereof with a permanent magnet member 101 which serves as a magnetic coupler.

A cantilever 102 of non-magnetic material is provided at proximal root part thereof with a pin 103 of ferromagnetic material extending in the lateral direction. The cantilever 102 is connected to the actuator in a state where the pin 103 engaged at opposite ends thereof with the V-shaped projections 97a and 97b is subjected to magnetic attractive force by the permanent magnet member 101. The pressure of the reproducing stylus 35 against the disc 11 is applied by a damper 104 of Rahmen or frame structure disposed between a part near its free end of the cantilever 102 and a support plate (not shown). By adopting this magnetic coupling arrangement, a replaceable cartridge including the cantilever can be realized.

The signal pickup device of the above described construction operates as follows.

Figure 8:
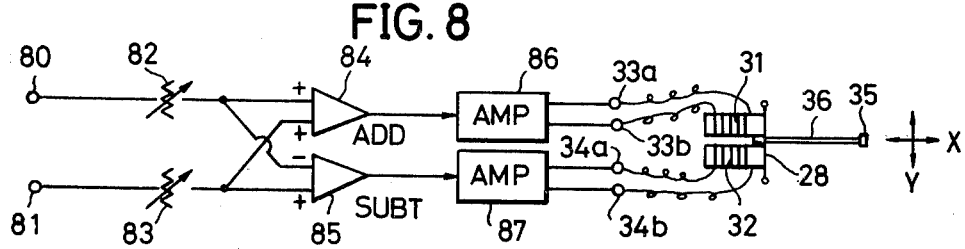
FIG. 8 is a block diagram of one example of an operation circuit for performing an operation of a tracking control signal and a jitter compensation signal.

In this embodiment of the device, the signal operation circuit indicated in FIG. 8 is not required. The tracking error signal current applied to the input terminal 107 in FIG. 13 is subjected to amplification by the driving amplifier 108 and then supplied to the pair of tracking control coils 98 and 99. When current flows through the coils 98 and 99 as indicated by symbols in FIG. 12, forces $F_4$ and $F_5$ of mutually opposite directions are induced in the coils 98 and 99 due to inter action with the magnetic field. As a result, the cantilever 102 rotates and the tracking control operation is thereby carried out.

The jitter compensation current applied to an input terminal 105 in FIG. 13 is amplified by a driving amplifier 106 and then supplied to the jitter compensation coil 100. When current flows through the coil 100, forces $F_6$ in the same direction are induced in the coil 100 due to interaction with the magnetic field. Consequently, the cantilever 102 undergoes a displacement in its axial direction, and the jitter compensation is thereby carried out.

Figure 9:
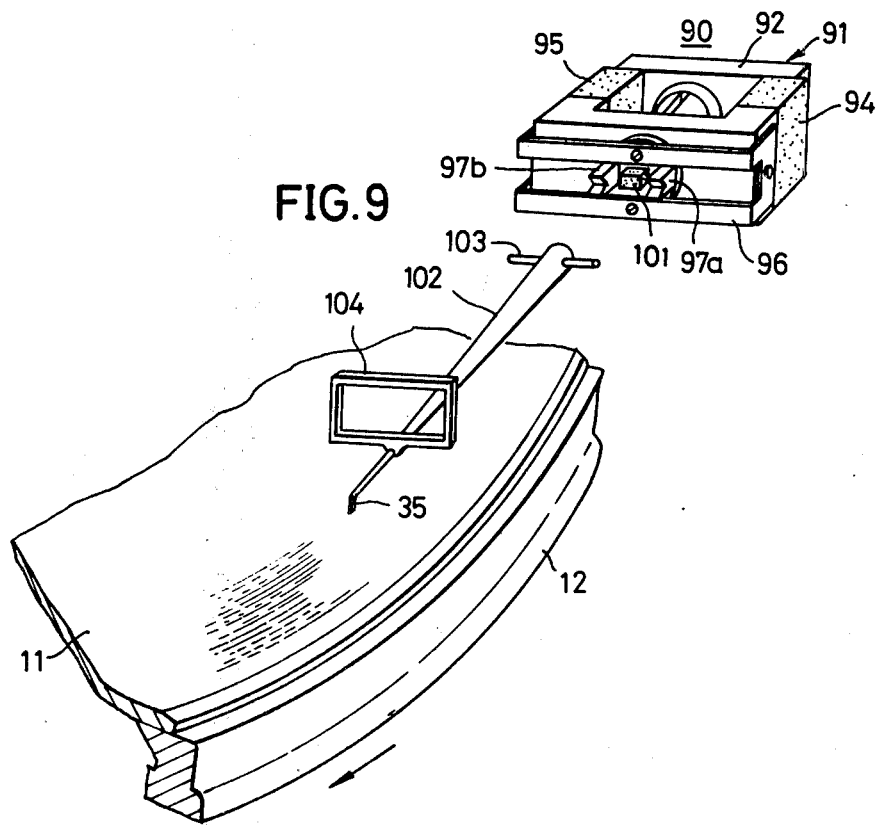
FIG. 9 is a perspective view of a second embodiment of a signal pickup device of the present invention.
Figure 12:
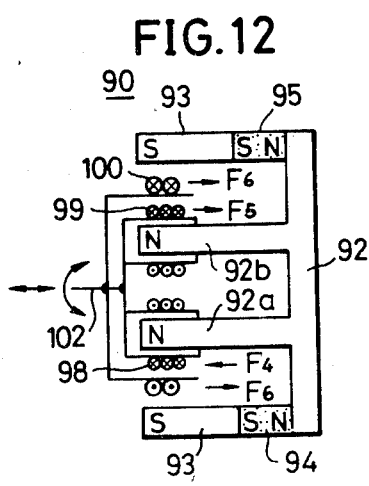
FIG. 12 is a schematic illustration showing an operational principle of the device shown in FIG. 9.
Figure 13:
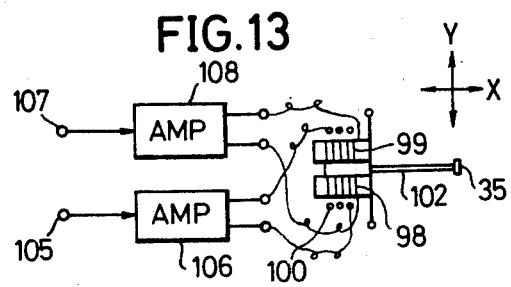
FIG. 13 is a block diagram showing one example of a circuit for driving the device illustrated in FIG. 9.

A modification of the device in FIG. 9 is illustrated in FIG. 14, in which those parts which are the same as corresponding parts in FIG. 12 are designated by like reference numerals.

In ths signal pickup device 110, the front plate comprises two separate members 111 and 112. The magnetic poles of a permanent magnet member 113 are reversed in relation to those of the magnet member 95. Accordingly, one yoke arm 92a assumes the S pole and the other yoke arm 92a assumes the N pole, and the members 112 and 111 respectively become the S pole and N pole.

Therefore, conversely to the preceding case, the couple of coils 98 and 99 serve as the jitter compensation coils and are subjected to displace in the axial direction of the cantilever when the jitter compensation signal currents flow therethrough. The single coil 100 serves as the tracking control coil and is subjected to rotate about an imaginary vertical axis when the tracking error current signal flows therethrough. As a result, the jitter compensation and tracking control operation are carried out, similarly as in the preceding embodiment.

Figure 16:
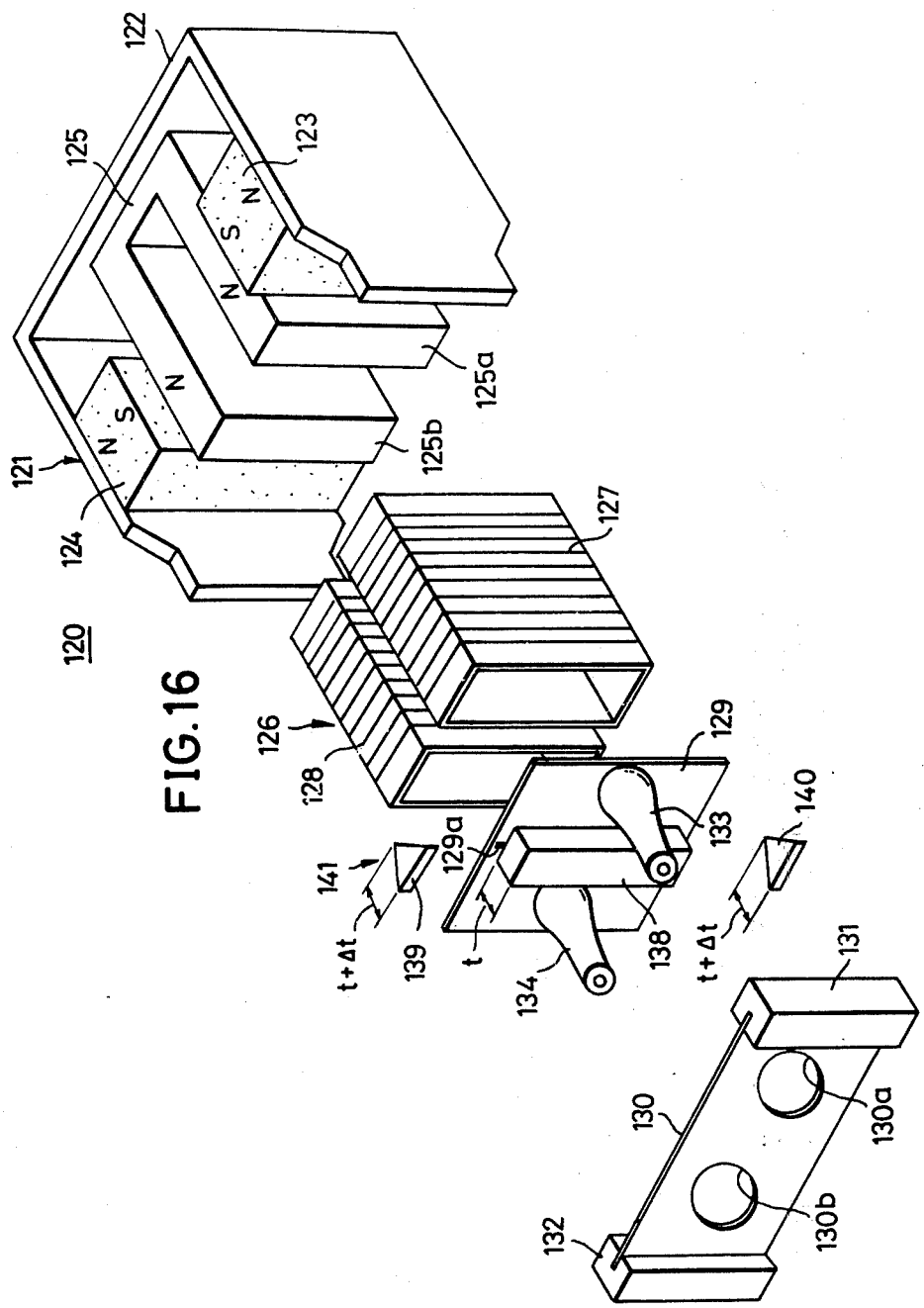
FIG. 16 is an exploded perspective view of the device illustrated in FIG. 15.

A third embodiment of the signal pickup device according to the present invention wll be described with reference to FIGS. 15 and 16. In this embodiment, the actuator is organized, similarly as in the actuator indicated in FIGS. 3 and 4, in such a manner that a pair of coils are disposed within the magnetic field and undergo motion when supplied with the output signal from the signal operation circuit shown in FIG. 8.

This signal pickup device 120 has a magnetic field forming structure 121 in which a ferromagnetic frame member 122 formed to bend into "U" shape is provided with permanent magnet members 123 and 124 secured to the inner surface of each arm thereof and with a U-shaped yoke 125 secured to the base thereof to be interposed between the permanent magnet members 123 and 124. The permanent magnet members 123 and 124 are magnetized so that their secured sides have the N poles and the opposite sides the S poles, whereby the yoke arms 125a and 125b assume the N poles. Accordingly, the strong magnetic fields are formed between the permanent magnet member 123 and the yoke arm 125a and between the permanent magnet member 124 and the yoke arm 125b. No magnetic field is formed between the yoke arms 125a and 125b.

A moving structure 126 comprises a pair of coils 127 and 128 wound in a rectangular shape. These coils 127 and 128 are secured to a rigid support plate 129 in mutually parallel and adjacent relationship, and are loosely fitted to the yoke arms 125a and 125b.

A leaf spring 130 made of phosphor bronze, for instance, is supported at opposite sides by rubber support members 131 and 132 and is stretched between distal ends of the arms of the frame member 122. This leaf spring 130 is formed with a pair of openings 130a and 130b, through which rubber dampers 133 and 134 fixed to the support plate 129 loosely project.

A cantilever 135 provided at its distal end with the reproducing stylus 35 is of organization in which two relatively long rods 136 and 137 are fixed each other at their distal ends and are thereby formed in V-shape. The rods 136 and 137 are inserted at their proximal root parts into the dampers 133 and 134, which operate to apply stylus pressure.

A rubber block 138 of the shape of a rectangular parallelepiped, and a pair of triangle fulcrum members 139, 140 made of hard material organize a suspension mechanism, which constitutes an essential part of the present embodiment. The rubber block 138 is positioned to extend vertically a center of the support plate 129, and is cemented or bonded at one side to the support plate 129 and at the opposite side to the leaf spring 130. The fulcrum member 139 is provided between the support plate 129 and the leaf spring 130, with base side thereof bonded to the support plate 129 and with vertex part thereof engaged with a groove 129a of the plate 129. The other fulcrum member 140 is provided between the support plate 129 and the leaf spring 130 as in the same manner. These fulcrum members 139 and 140 are respectively disposed to confront with the top and bottom surfaces of the block 138, at different height positions on the central vertical line of the plate 129. A vertical line l passing through each vertex part of the fulcrum members 139 and 140 becomes a rotating axis of the support plate 129 and coils 127 and 128.

Moreover, the sizes of the block 138 and the fulcrum members 139, 140 are respectively set so that the dimentions in the longitudinal direction of the device are t and $t+\Delta t$. Accordingly, when the fulcrum members 139 and 140 are inserted, the rubber block 138 is elongated by a small amount in the above mentioned direction, whereby the fulcrum members 139 and 140 are positively clamped by the elastic force of the block 138 between the support plate 129 and the leaf spring 130.

When the coils 127 and 128 are supplied with current from the operation circuit indicated in FIG. 8 and is thereby subjected to rotate about Z axis, similarly as in the case shown in FIG. 5A, the coils 127, 128, the support plate 129, and the cantilever 135 undergo rotation smoothly about the above mentioned line l, whereby the tracking control operation is carried out accurately.

Moreover, when the coils 127 and 128 are subjected to displace in the arrow direction X, similarly as in the case shown in FIG. 5B, the displacing force is transmitted by way of the fulcrum members 139 and 140 to the leaf spring 130. The leaf spring 130, which supported at opposite sides thereof by the support members 131 and 132, deforms or bends with ease in the arrow direction X and does not deform in the other direction. Accordingly, the cantilever 137 displaces in the arrow direction X, accompanied by a bending of the leaf spring 130, whereby the jitter compensation operation is carried out accurately.

Moreover, in the suspension mechanism, the leaf spring 130 hardly deforms in the arrow direction Y, and the vertex parts of the fulcrum members 139 and 140 engages with the groove 129a on the support plate 129, and further, the rubber block 138 is cemented on the opposite side surfaces thereof to the support plate 129 and the leaf spring 130. According to this organization, the moving structure 126 does not displace in the arrow direction Y. Further, since the leaf spring 130 hardly deforms in torsional manner about the axis Y, any rotation of the moving structure 126 about the axis Y, which arising fluctuation of the stylus pressure, does not occur. Consequently, undesirable oscillating motion of the moving structure is effectively suppressed.

A fourth embodiment of the signal pickup device according to the present invention will now be described with reference to FIG. 17, in which those parts which are the same as corresponding parts in FIG. 15 are designated by like reference numerals. Description of such parts will be omitted.

A signal pickup device 150 has a pair of pivot bearings 151 and 152 which are secured to the support plate 129 and are formed at their distal ends with V-shaped grooves 151a and 152a extending in the horizontal direction. These pivot bearings 151 and 152 are disposed apart on the lateral center line of the moving structure 126. The rods 136 and 137 of the cantilever 135 are provided at their proximal ends with circular cone-shaped pivots 136a and 137b made of hard material.

A rubber member 153 for imparting stylus pressure has the shape of circular truncated cone and is fixed to the leaf spring 130 at center position thereof. A rubber plate member 154 for imparting connecting force is fixed to the distal end of the stylus pressure imparting member 153. The rods 136 and 137 pierce through the plate member 154 at parts near the opposite ends and are fixed thereto. The rubber plate member 154 is being bent forcedly to form V-shape substantially thereby accumulating elastic force therein. By this elastic force, the cantilever 135 is subjected to displace in the direction toward the moving structure 126, whereby the pivots 136a and 137a are respectively engaged with the V-shaped grooves 151a and 152a and further are pressed thereagainst. The elastic force of the member 153 is transmitted to the reproducing stylus 35 by way of the member 154 and the cantilever 135, whereby the stylus 35 is pressed against the disc at a predetermined pressure.

The motion of the moving structure 126 in response to the control signal current supplied thereto is faithfully transmitted to the cantilever 135 by way of the pivot bearings 151 and 152 and the pivots 136a and 137a, whereby the reproducing stylus 35 undergoes a displacement in the arrow directions X and Y, and tracking control and jitter compensation are achieved with accuracy.

Here, when the jitter compensation is carried out, in particular, the member 153 undergoes a displacement together with the leaf spring 30 in the arrow direction X. This member 153, however, has no connection with the transmitting operation, whereby the above mentioned jitter compensation is carried out with higher accuracy.

The member 153 and the member 154, which are separate members, may be formed unitarily.

A fifth embodiment of the device of the present invention will be described with reference to FIG. 18. This embodiment is a modification of the embodiment shown in FIG. 17. In FIG. 18, those parts which are the same as corresponding parts in FIG. 17 are designated by like reference numerals and the detailed description of such parts will be omitted.

In this signal pickup device 160, the rods 136 and 137 of the cantilever 135 are connected by a light and rigid connection member 161, to which a permanent magnet member 162 is fixed. Another permanent magnet member 163 is bonded to the leaf spring 130 at its center part.

The magnetic attraction force operating between the pair of permanent magnet members 162 and 163 confronting each other with a specific distance therebetween causes the pivots 136a and 137a to be pressed respectively against the pivot bearings 151 and 152, whereby the cantilever 135 is connected mechanically to the moving structure 126. Moreover, since the position where the permanent magnet member 163 is fixed with respect to the pivot bearings 151 and 152 is determined, similarly as in the embodiment described hereinafter, the magnetic attraction force also imparts a predetermined stylus pressure to the stylus.

The motion of the moving structure 126 in response to the control signal current is transmitted to the cantilever faithfully, and the accurate tracking control and jitter compensation are achieved similarly as in the preceding embodiment shown in FIG. 17.

A sixth embodiment of the signal pickup device of the present invention will be described with reference to FIG. 19 through FIG. 26, in which those parts which are the same as corresponding parts in FIG. 15 and FIG. 17 are designated by like reference numerals. Description of such parts will be omitted. This embodiment has a structure wherein the cantilever can be loaded to and unloaded from the actuator.

This signal pickup device 170 substantially comprises an actuator 171 having the magnetic field forming structure 121 and the moving structure 126 and secured to the carriage, and a cartridge structure 172 supporting the cantilever 135 and adapted to be replaceable.

In the actuator 171, a column 173 is provided between the bridge members 174 and 175 transversing between the arms of the frame member 122, into which column 173 is threadably engaged with a skrew 176 for determining loaded position of the cartridge structure 172.

The cartridge structure 172, when it is not being loaded, assumes a state indicated in FIG. 20 and FIG. 21, and in which state the cantilever 135 is being supported by a support plate 177. The rods 136 and 137 of the cantilever 135 are fixed to parts near opposite ends of a bridge member 178. A rectangular magnetic plate 179 is bonded to a rear surface of the bridge member 178. A bracket 180 is skrew fastened to the support plate 177 on the bottom surface thereof. A magnet plate 181 of the shape which is the same as that of the magnet plate 179 is cemented to a downwardly extending plate part of the bracket 180. A non-magnetic guide plate 182 which has an opening 182a of the shape corresponding to the magnet plate 181 and has a thickness thicker than that of the magnet plate 181 is bonded to the bracket 180 with the opening 182a being engaged with the magnet plate 181. The magnet plates 179 and 181 are magnetized in their thickness direction as indicated in FIG. 22. Instead of this magnet plates 179 and 181, a pair of magnet plates 183 and 184 which are magnetized in their lateral width direction may be used.

The magnet plates 179 and 181 attract to contact with their peripheral edges coinciding each other in their autonomous action, and the undesired displacement of the magnet plate 179 is restricted by the opening peripheral wall of the guide plate 182. As a result, the cantilever 135 is held stably. A lead wire 185 is connected its one end to the electrode of the reproducing stylus 35 and the other end to a terminal 186 on the bottom of the support plate 177.

Figure 24:
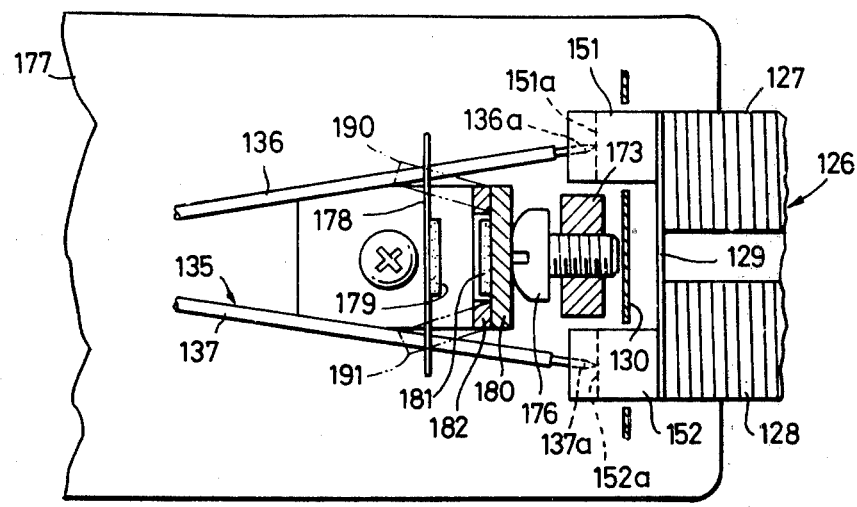
FIG. 24 is a bottom view, in section, showing an essential part of the signal pickup device in a state where the cartridge structure is loaded.
Figure 25:
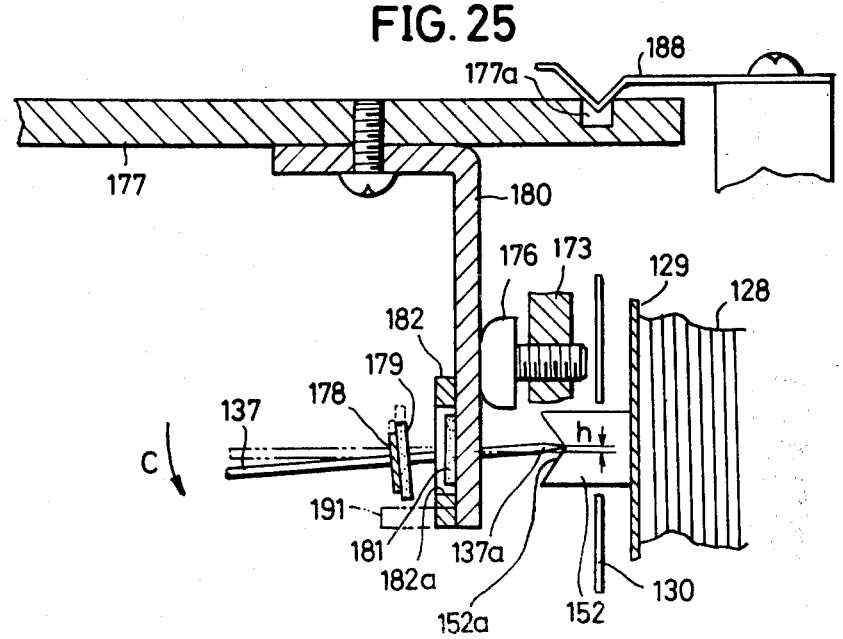
FIG. 25 is a side view, in section, showing the signal pickup device illustrated in FIG. 24.

The cartridge structure 172 is inserted, with the opposite sides of the support plate 177 being guided by guide grooves (not shown), in the arrow direction A in FIG. 19, and is thereby loaded to the actuator 171. The cantilever 135 is then connected mechanically to the actuator 171 as indicated in FIGS. 19, 24, and 25.

By inserting the cartridge structure 172 in the arrow direction A, the pivots 136a and 137a respectively make contact with the V-shaped grooves of the pivot bearings 151 and 152 whereby the pivot bearings are pushed in the arrow direction A, accompanied by a bending of the leaf spring 130. When the cartridge structure 172 is inserted further, the contact connection of the magnet plates 179 and 181 is released, and the support plate 177 and the bracket 180 move independently from the cantilever 135, to reach a position where the rear surface of the bracket engages with a screw head of the screw 176. The leaf spring 30 is then restored.

A bent part of a leaf spring 188 engages with a groove 177a of the support plate 177, whereby the plate 177 is held at a predetermined position. The position where the support plate 177 finally reaches is adjusted by manipulatively turning the screw 176. Moreover, this position, determines the magnitude of magnetic attractive force exerted between the aparted magnet plates 179 and 181.

When the cartridge structure 172 is being loaded as described above, the cantilever 135 is subjected to displace toward the moving structure 126 by the magnetic attractive force acting between the magnet plates 179 and 181, whereby the pivots 136a and 137a are respectively pressed against the pivot bearings 151 and 152. Thus, the cantilever 135 is connected mechanically to the moving structure 126.

Moreover, when the cartridge structure is loaded, the magnet plate 179 which aparts from the stationary magnet plate 181 moves together with the cantilever 135 to a position where the magnetic attractive force with respect to the magnet plate 181 becomes maximum. In the present embodiment, since the magnet plate 181 is disposed at a position lower than the pivot bearings 151 and 152 by a height h, as shown in FIG. 25, the cantilever 135 rotates to a stable position in the direction C toward the disc, when the cartridge structure 135 is loaded.

At the time when the reproducing stylus 35 is put on the disc to be reproduced, the cantilever 135 is rotated to a position indicated by two-dot chain lines in FIG. 25, and the magnet plate 179 is deviated from the stable position. Accordingly, the magnet plate 179 is exerted with the force for returning it to the stable position, whereby a predetermined stylus pressure is applied to the stylus 35.

When the cartridge structure 172 is pulled out in the arrow direction B for unloading it from the carriage, the magnet plate 179 is attracted to contact with the magnet plate 181 with coinciding their peripheries and engages into the opening 182a. Thus, the cantilever 135 is supported by the support plate 177.

Figure 26:
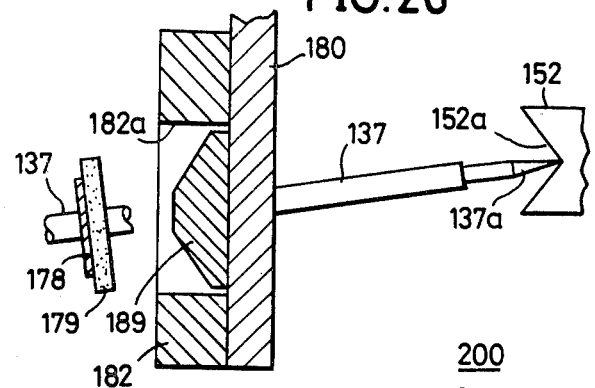
FIG. 26 is a fragmentary view showing embodiment in which a ferromagnetic material member is used in place of a stationary magnet plate.

Moreover, as shown in FIG. 26 a ferromagnetic material member 189 may be used instead of the stationary magnet plate 181. The ferromagnetic material member 189 is formed with convex shape at the center portion. According to this arrangement, the magnet plate 179 is held stably only at a single position indicated in the same figure.

As a modification of the above described embodiment, a pair of arms 190 and 191 may be provided at the vertically extending part of the bracket 180 as indicated by two-dot chain lines in FIGS. 24 and 25. When the cantilever 135 undergoes rotation in the arrow direction C in FIG. 25 at the time whereupon the loading of cartridge structure is completed, the transverse bridge member 178 abuts against the arms 190 and 191. As a result, the excessive rotation of the cantilever 135 is restricted, whereby any occurence of trouble wherein the lead wire 185 is tightened to be cut off is prevented.

A seventh embodiment of a signal pickup device of the present invention will be described with reference to FIG. 27 through FIG. 34, in which those parts which are substantially the same as corresponding parts in FIGS. 15, 17 and 19 are designated by like reference numerals. Description of such parts will be omitted.

Figure 27:
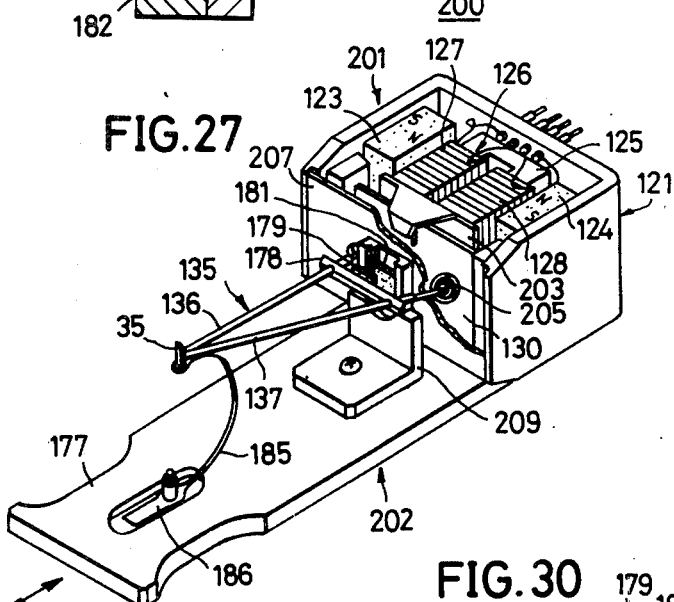
FIG. 27 is a perspective view, with parts cut away, showing a seventh embodiment of a signal pickup device of the invention, as viewed from the bottom.

Referring to FIG. 27, a signal pickup device 200 comprises an actuator 201 and a cartridge structure 202.

Figure 28:
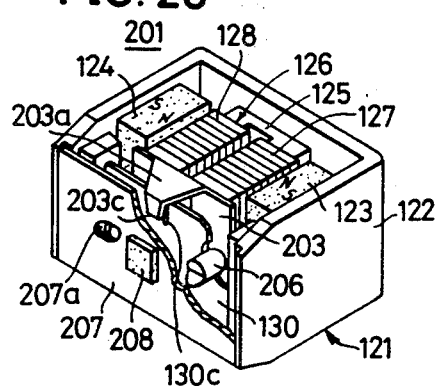
FIG. 28 is a perspective view, with parts cut away, of an actuator in FIG. 27.

Referring to FIG. 28 and FIG. 29, the actuator 201 has a support plate 203 having at its top and bottom sides hook-shaped arms 203a and 203b, which respectively have their distal ends triangular fingers 203c and 203d. A rubber block 204 having the shape of a rectangular parallele piped is cemented to the center of the support plate 203 and extends vertically. The vertex parts of the fingers 203c and 203d are respectively engaged with narrow-width grooves 130c and 130d formed on the leaf spring 130. The rubber block 204 is clamped between the support plate 203 and the leaf spring 130 and is compressed to deform slightly by the elastic force of the hook arms 203a and 203b. By the elastic force exerted by the hook arms 203a and 203b and the expansion force exerted by the rubber block 204, the fingers 203c and 203d are positively held to be engaged with the grooves 130c and 130d, also in the operational mode. This suspension mechanism operates, in substantially same manner as in the suspension mechanism of the embodiment indicated in FIG. 15.

Pivot bearings 205 and 206 are fixed to the support plate 203 at parts near its opposite sides. One pivot bearing 205 is formed with a cone-shaped grooves 205a, and another pivot bearing 206 is formed with a V-shaped groove 206a extending laterally. This arrangement allow the cantilever 135 to be connected to the actuator 201 without any difficulties, even in the case where some error exists in the distance between the pivots 136a and 137a of the cantilever 135.

The frame member 122 is provided at its front with a rigid front plate 207, which is formed with elliptical openings 207a and 207b extending laterally at positions corresponding to the pivot bearings 205 and 206. A magnet plate 208 is bonded to the front plate 207 at its center part.

Figure 30:
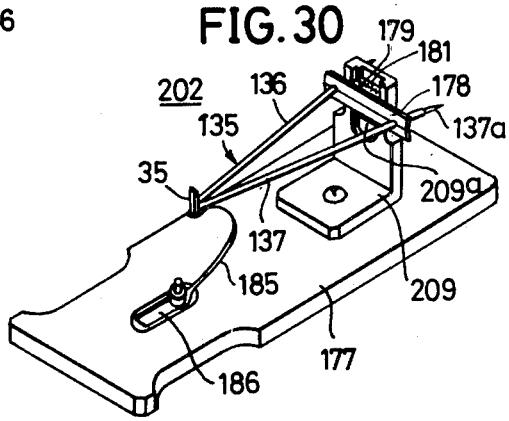
FIG. 30 is a perspective view of a cartridge structure illustrated in FIG. 27.
Figure 31:
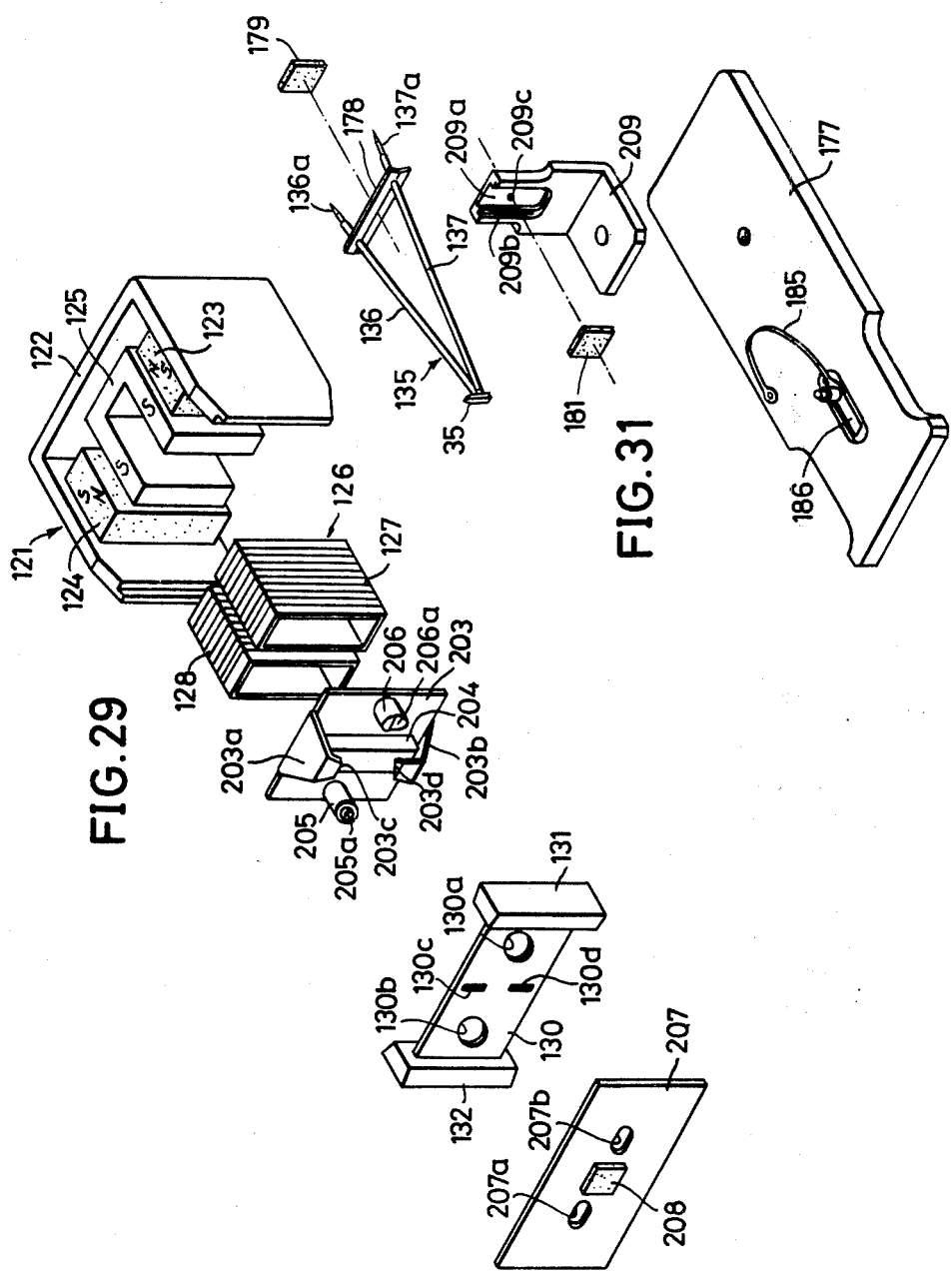
FIG. 31 is an exploded perspective view of the cartridge structure in FIG. 30.

Referring to FIGS. 30 and 31, the cartridge structure 202 has a bracket 209 mounted to the support plate 177. The bracket 209 is formed on one side surface of the vertical parts with a stepped groove 209a extending longitudinally. The magnet plate 181 is fitted into the groove 209a, and a stepped part 209b serves as a guide for the magnet plate 179. The bracket 209 is of ferromagnetic material.

When the cartridge structure 202 is not being loaded, the magnet plate 179 attracts to contact with the magnet plate 181, and the cantilever 135 is supported stably to the support plate 177.

Here, when assembling the cartridge structure 202, it is required to set the reproducing stylus 35 at a predetermined height position with respect to the support plate 177. The manipulation for adjusting the above position is carried out as follows. In a state where the cartridge structure 202 has been loaded to the actuator 201, and the magnet plates 179 and 181 are resultingly separated and attracted each other with a space gap in their between, as described hereinafter, the magnet plate 181 is manipulated to shift along the groove 209a, whereby the reproducing stylus 35 displaces unitarily with the cantilever 135 in the height direction. Whereupon the reproducing stylus 35 reaches a predetermined height position, the adhesive is injected through a hole 209c, and the magnet plate 181 is thereby bonded.

Figure 32:
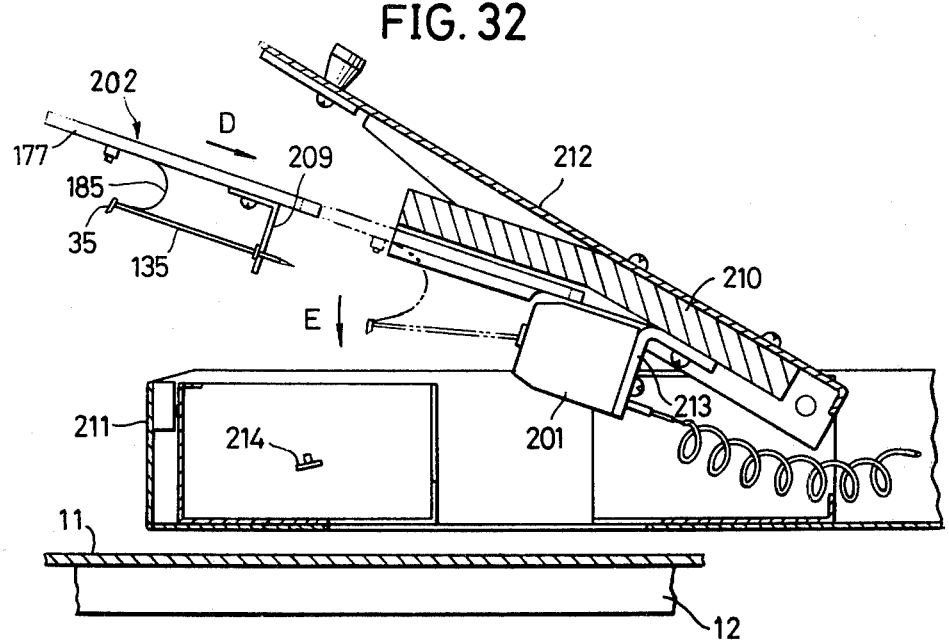
FIG. 32 is an elevational view, in section, showing the signal pickup device in a state where the cartridge structure is to be loaded.
Figure 33:
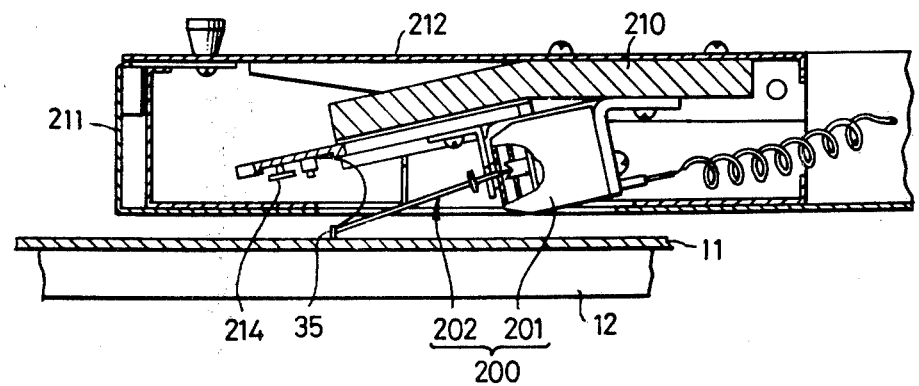
FIG. 33 is a longitudinal section of the signal pickup device in a disc reproducing state after the cartridge structure has been loaded.
Figure 34:
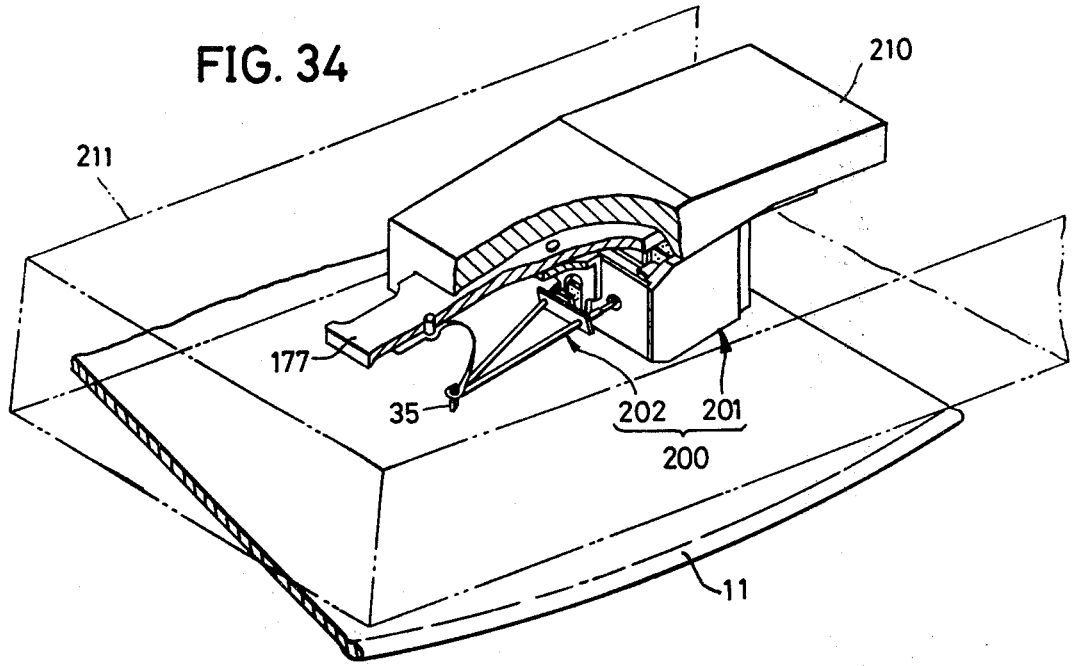
FIG. 34 is a perspective view, with pats cut away, showing the signal pickup device under a state in FIG. 33.

The cartridge structure 202 is inserted and loaded as indicated in FIG. 32, and the signal pickup device 200 carries out disc reproducing operation in a state indicated in FIGS. 33 and 34.

Referring to FIG. 32, a support base 210 is skrew fastened to a lid 212 hinged on a shaft of a carriage 211, and the actuator 201 is secured by way of a bracket 213 to the support base 210. The cartridge structure 202 is loaded with the lid 212 in the opened state. The cartridge structure 202 is inserted, in the arrow direction D, into the support base 210, and is loaded as indicated by two-dot chain line, in a state where the bracket 209 is attracted to contact with the magnet plate 208.

Whereupon this loading is completed, the cantilever 135 undergoes a rotation in the arrow direction E caused by a disposed relationship between the magnet plate 180 and the pivot bearings 205 and 206. As the cantilever 135 rotates, the proximal part thereof comes to abut against the side wall of the openings 207a and 207b, whereby the rotation of the cantilever 135 is restricted at a position indicated by the two-dot chain lines. Therefore, the trouble that the lead wire 185 is cut off does not whatsoever occur.

When the lid 212 is closed, the terminal 186 is connected to a central conductor 214 of a re-entrant cylindrical cavity resonator, and further by manipulating the reproducing stylus elevating mechanism, the reproducing stylus 35 makes in contact with the disc 11.

When reproducing the disc, the moving structure 126 moves in response to the control signal current, and the tracking control and jitter compensation are carried out, similarly as in the preceding embodiments.

Figure 35:
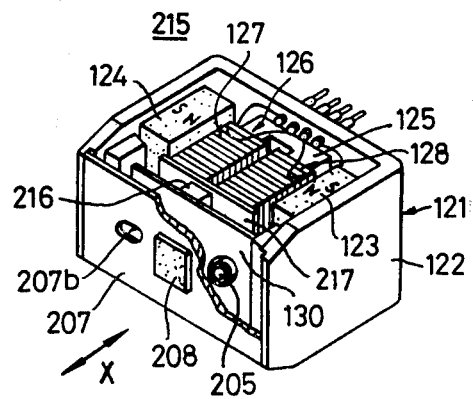
FIG. 35 is perspective view of another embodiment of the actuator illustrated in FIG. 29.

Moreover, in the aforementioned embodiment device, an actuator 215 shown in FIG. 35 may be used instead the actuator 201. This actuator 215 differs from the actuator 201 in its suspension mechanism. The suspension mechanism of this actuator 215 has a structure wherein a block 216 having the shape of a rectangular parallelepiped and made of alluminum or rubber is inserted between the support plate 217 and the leaf spring 130, with an orientation extending vertically, and is cemented at its opposite side surface to the support plate 217 and the leaf spring 130.

In this organization, the leaf spring 130 is substantially deformed to a S-shape at the time of tracking control operation, and is deformed in the arrow direction X, similary as in the preceding embodiment, at the time of jitter compensation operation.

Further, this invention is not limited to these embodiments but various variations and modifications may be made without departing from the scope of the invention.

What is claimed is:

1. A signal pickup device in an apparatus for reproducing an information signal recorded on a track on a rotary recording medium in a horizontal surface, said signal pickup device comprising:

a reproducing stylus for tracking the track on the rotary recording medium thereby to reproduce the information signal;

a cantilever provided at a free distal end thereof with the reproducing stylus;

means for supporting said cantilever so as to be rotatable about substantially proximal root end thereof and movable in an longitudinal direction thereof;

coil means including at least two movable coils fixed to said support means;

means for generating a control signal current in response to deviation of the tracing position of said reproducing stylus from a track to be traced, and supplying the control signal to said coils; and magnetic field forming means secured at a predetermined position of a main body of the device and adapted to apply to said coils a magnetic field in a direction parallel with the rotary recording medium, said coils undergoing a motion due to a mutual interaction between the magnetic field and the current flowing therethrough, whereby said reproducing stylus is displaced by way of said cantilever at least in the width of said track and is thereby tracking controlled.

2. A signal pickup device as claimed in claim 1 in which said magnetic field forming structure comprises inner magnet pole members assuming the same magnet pole and fitted into the two coils with a gap therearound and outer magnet pole members assuming the magnet pole opposite to that of said inner magnet pole member and confronting with outside lateral faces of said two coils, whereby said two coils are so disposed that only the vertical winding face parts opposite to the mutually confronting winding face parts are positioned within the magnetic field formed by said magnetic field forming means.

3. A signal pickup device as claimed in claim 1 in which each of said two coils is of rectangular shape in the cross section taken along a surface prependicular to the winding axis thereof.

4. A signal pickup device as claimed in claim 1, in which said means for supporting said cantilever comprises a rigid support plate supporting the proximal root part of said cantilever, a leaf spring member disposed to confront with said support plate with a space therebetween and adapted to deform or bend only in the longitudinal direction of said cantilever, and mechanisms for connecting mechanically said support plate to said leaf spring member, and for supporting said support plate with respect to said leaf spring member in a rotatable manner about a hypothetic vertical axis.

5. A signal pickup device as claimed in claim 1, in which said means for supporting said cantilever comprises a rigid support plate supporting the proximal root part of said cantilever, a leaf spring member disposed to confront with said support plate with a space therebetween and adapted to deform or bend only in the longitudinal direction of said cantilever, and a long and narrow block member inserted into a center space between said rigid support plate and said leaf spring member, with extended in a vertical direction, and bonded to said rigid support plate and to said leaf spring member.

6. A signal pickup device as claimed in claim 1, in which said cantilever has a forked shape and provided at proximal root parts thereof with pivots, and said means for supporting said cantilever comprises:

a rigid plate movably supported;

a pair of pivot bearing members which are secured to said rigid support plate on its central horizontal line with being apart each other;

a member holding the forked cantilever and adapted to cause the pivots to engage with said pivot bearings positively; and a member for subjecting a rotational displacement to said cantilever thereby imparting to said reproducing stylus a pressure against said rotary recording medium.

7. A signal pickup device as claimed in claim 1, in which said cantilever has a forked shape and provided at proximal root parts thereof with pivots, and said means for supporting said cantilever comprises:

a rigid plate movably supported;

a pair of pivot bearing members which are secured to said rigid support plate on its central horizontal line with aparted each other;

a first permanent magnet member bonded to the forked cantilever; and a second permanent magnet member fixed to the main body of the divice and confronting with said first permanent magnet member with a space therebetween, a magnetic attractive force exerted between said pair of permanent magnet members causing said pivots of said cantilever to press against said pivot bearings and imparting to said reproducing stylus a pressure against said rotary recording medium.

8. A signal pickup device as claimed in claim 1, in which, said signal pickup device comprises an actuator accommodating said coil means therein and secured to a stationary main body of the device, and a cartridge structure supporting said cantilever and adapted to be replaceable with respect to said stationary main body, said actuator includes a rigid support plate fixed with said coil means and having a pair of pivot bearing members secured thereto on its central horizontal line with being apart each other, said cartridge structure holds a forked cantilever provided at its proximal root parts with pivots in a state where a first permanent magnet member fixed to said cantilever is attracted to contact with a second permanent magnet member bonded to said cartridge structure at a predetermined position thereof, when said cartridge structure is being loaded to said main structure, said first and second permanent magnet members with being each other, and a magnetic attractive force exerted between said pair of permanent magnet members causing said pivots of said cantilever to engage with and press against said pivot bearings and imparting to said reproducing stylus a pressure against the rotary recording medium.

9. A signal pickup device in an apparatus for reproducing an information signal recorded on a track on a rotary recording medium in a horizontal surface, said signal pickup device comprising:

a reproducing stylus for tracing the track on the rotary recording medium thereby to reproduce the information signal;

a cantilever provided at a free distal end thereof with the reproducing stylus;

means for supporting said cantilever so as to be rotatable about substantially proximal root end thereof and movable in an longitudinal direction thereof;

coil means including at least two movable coils fixed to said support means, with the winding axial direction thereof coinciding with the longitudinal direction, and supplied with a control signal independently;

means generating a control signal current to be supplied to said coils, and including a circuit for generating a tracking control signal current in response to tracking error, a circuit for generating a jitter compensation signal current in response to a magnitude of jitter detected, and operating circuit for conducting adding and subtracting operation between said tracking control signal current and said jitter compensation signal current, and magnetic field forming means secured at a predetermined position of a main body of the device and adapted to apply to said coils a magnetic field in a direction parallel with the rotary recording medium, said coils undergoing a motion due to a mutual interaction between the magnetic field and the current flowing therethrough, whereby said reproducing stylus is displaced by way of said cantilever in the width direction and longitudinal direction of said track and tracking control and jitter compensation are thereby accomplished.

10. A signal pickup device in an apparatus for reproducing an information signal recorded on a track on a rotary recording medium in a horizontal surface, said signal pickup device comprising:

a reproducing stylus for tracing the track on the rotary recording medium thereby to reproduce the information signal;

a cantilever provided at a free distal end thereof with the reproducing stylus;

means for supporting said cantilever so as to be rotatable about substantially proximal root end thereof and movable in a longitudinal direction thereof;

coil means including two movable coils connected in series and a single movable coil fixed to said support means, with the winding axial direction thereof coinciding with the longitudinal direction;

means generating a control signal current to be supplied to said coils, and comprising a circuit for generating a tracking control signal current in response to tracking error, and a circuit for generating a jitter compensation signal current in response to a magnitude of jitter detected; and magnetic field forming means secured at a predetermined position of a main body of the device and adapted to apply to said coils a magnetic field in a direction parallel with the rotary recording medium;

said coils undergoing a motion due to a mutual interaction between the magnetic field and the current flowing therethrough, whereby said reproducing stylus is displaced by way of said contilever in the width direction and longitudinal direction of said track and tracking control and jitter compensation are thereby accomplished.

* * * * *